Inventors:
PAUL GERRETZ
LUDWIG WAGNER
BY:

United States Patent Office 3,453,010
Patented July 1, 1969

3,453,010
FLANGE CONNECTION FOR PRESSURE CONDUITS
Paul Gerretz, Hohenzollernstr. 185, Monchen-Gladbach, Germany, and Ludwig Wagner, Hunefeldstr. 4, Dusseldorf, Germany
Filed May 22, 1967, Ser. No. 639,948
Claims priority, application Germany, May 24, 1966, M 69,597
Int. Cl. F16l 19/00, 19/02, 23/00
U.S. Cl. 285—368         13 Claims

ABSTRACT OF THE DISCLOSURE

A flange connection for pressure conduit pipes wherein two loose flanges are mutually braced. At least one of the flanges is supported on the corresponding pipe end by means of a divided spacer ring. Flanges and ring consist of strong material. The height of the support surface associated with the ring is higher than that of the support surface of the flange, and the outer diameter of the spacer ring is smaller than its inside diameter multiplied by 4 times the rate of the radius of curvature of its annularly curved supporting inner surface, associated with the pipe end.

---

Pipe connections having loose flange rings have previously been described, for instance in prior patents and catalogs. The same teach a collar at the pipe end which adjoins an intermediate or spacer ring.

The prior art discloses pipe connections which provide a circular groove or slot on the pipe end wherein the spacer or intermediate ring is disposed. A disadvantage of these arrangements resides in the size requirements because the connections must be comparatively large so that the flanges have large outer diameter.

It is an object of the invention to provide a pressure conduit whose flange connection is of particularly small diameter. The bolts holding the flanges together are to be close to the pipes.

This is accomplished by constructing flanges and spacer rings of a strong material and by making the height of the support surface associated with the spacer ring or the height of the annular groove in the pipe end, respectively, larger than the height of the supporting surface in the flange, and by making the outer diameter of the spacer ring smaller than its inside diameter by four times the rate of the radius of curvature of its annularly curved inner diameter associated with the pipe end. The support surface required for the pipe end may be formed by a collar which is present thereon or provided for the purpose which may be prewelded.

In a preferred embodiment, the spacer ring is disposed in a circular groove at the pipe end. This construction permits a very small outer diameter of the connection. Thus, the bore diameter of the holes accommodating the connector bolts can be limited to a size which is much smaller than customary for flange connections. The closer the bolts are disposed toward the pipe, the more favorable the course of the flexural torque in the flange. Thus, a gasket between the pipe ends, e.g., a metal gasket, can be subjected to optimal pressure, if desired by means of a tension wrench, since the elasticity of the flange has little effect owing to the shortened lever arm based on the decrease of the bore hole.

The sizes of the inner and outer load bearing annular surfaces of the spacer ring are adapted to the materials from which the pipe or the flange, respectively, are manufactured. They preferably are of high-grade steel so that flange, spacer ring and bolts can be used on pipes of any material. These steels permit high surface or contact pressure. The inner loadbearing ring surface has such dimensions, by selecting a suitable radius of curvature, that no overload is generated by excessive surface pressure even with pipes made of materials having low strength characteristics.

In another embodiment, the spacer ring is not uniform in its cross sectional shape. Within an assumed circle, the outer ring surface is in the form of a sector, the inner surface a quadrant whose extremities abut those of the sector. Such a spacer ring facilitates dimensioning of the pipe connector which is advantageous with regard to its axial direction.

A particularly preferred embodiment is that wherein the outer ring surface, seen in cross section, also is annularly curved but has a smaller radius of curvature than the inner one and has a common center of curvature therewith. It goes without saying that the flange has a congruent curvature of the shoulder surfaces so that the spacer ring joins closely thereon with its entire loadbearing surface.

This preferred embodiment denotes particular progress in the joining of high pressure conduits wherein uniform distribution of the connecting force on the pipe periphery is of importance. The ring thus shaped is capable of twisting and to adapt itself to irregularities in the groove, which commonly are present, in the form of an ideal circle. This twisting is feasible solely, except for friction, by means of the circular diameter of the outer ring surface and corresponding curvature of the shoulder of the flange. A certain slit between the two parts of the divided spacer ring naturally is required which, however, usually is present because the divided spacer ring is produced by sawing through a complete ring.

It is of advantage regarding the flow of the forces that the ring surfaces of the spacer ring have a common radius of curvature. The ratio of the radius of the outer surface to that of the inner one should be 1:1.4 to 1:2.6, and preferably 1:2.

In a further embodiment of the invention, the quadrant-shaped inner ring surface, at a point determining the inner diameter of the spacer ring, is offset shortly before the point nearest the ring axis of the imaginary circle about the curvature center, thereby forming an edge. This prevents the generation of oppositely directed shearing forces when the ring is disposed in a semi-annular groove due to slight twisting of the ring. These forces may occur because the pipe periphery usually is not an ideal circle so that a groove also might deviate from the circular shape.

One of the many advantages of the invention resides in the feasibility of connecting pipes which, within certain limits, form angles with each other. Both frontal areas then are beveled correspondingly and provided with an annular groove parallel to the frontal area. The elastic spacer ring is capable of conforming with the ensuing elliptical shape of the groove.

Pipe conduits manufactured according to the invention hence not only have the considerable advantage that they can be laid closer to each other than usual, but that slight deviations from the course of the conduits require neither elbows nor bending of the pipe.

In still another embodiment, a synclinal recess is provided between the inner and outer ring surface at the outer periphery of the spacer ring wherein an elastic element, e.g., a rubber ring, may be disposed. The installation of a pipe line thereby is facilitated because the two-piece spacer ring is kept in position by the stretch element. In vertical conduits the semiannular groove furnishes the additional advantage of preventing the spacer ring from slipping, as is possible when using a collar.

The invention now will be more fully explained with reference to the accompanying drawings. However, it should be understood that these are given merely by way of illustration, and not of limitation, and that it is intended to cover all variations of the invention.

Figure 1:
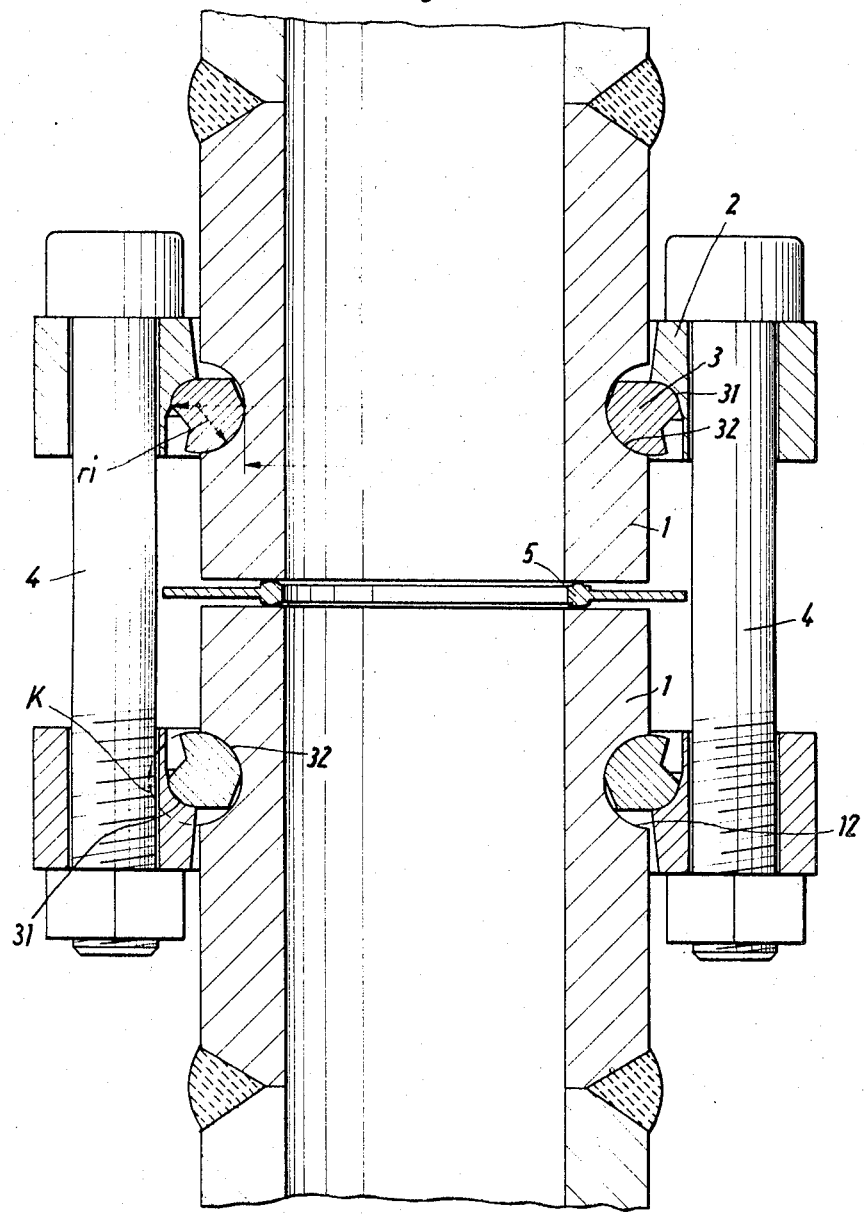
FIG. 1 is an elevation in section of pressure pipes showing one embodiment of a spacer ring.

Referring now to these drawings, in FIG. 1, abutting pipe ends 1 are connected by loose flanges 2 by way of divided spacer rings 3 and bolts 4. A metal gasket 5 is inserted between the ends 1. Spacer ring 3 has an outer surface 31, that engages a surface of the flange 2, and an inner surface 32. These loadbearing surfaces have circular cross section. The outer diameter of the spacer ring 3 is smaller than the inner diameter multiplied by four times the radius of curvature $ri$ of the inner ring surface 32. The spacer ring 3 is disposed in an annular groove 12 in pipe end 1. K is an imaginery circle, shown in broken lines, as previously described.

Figure 2:
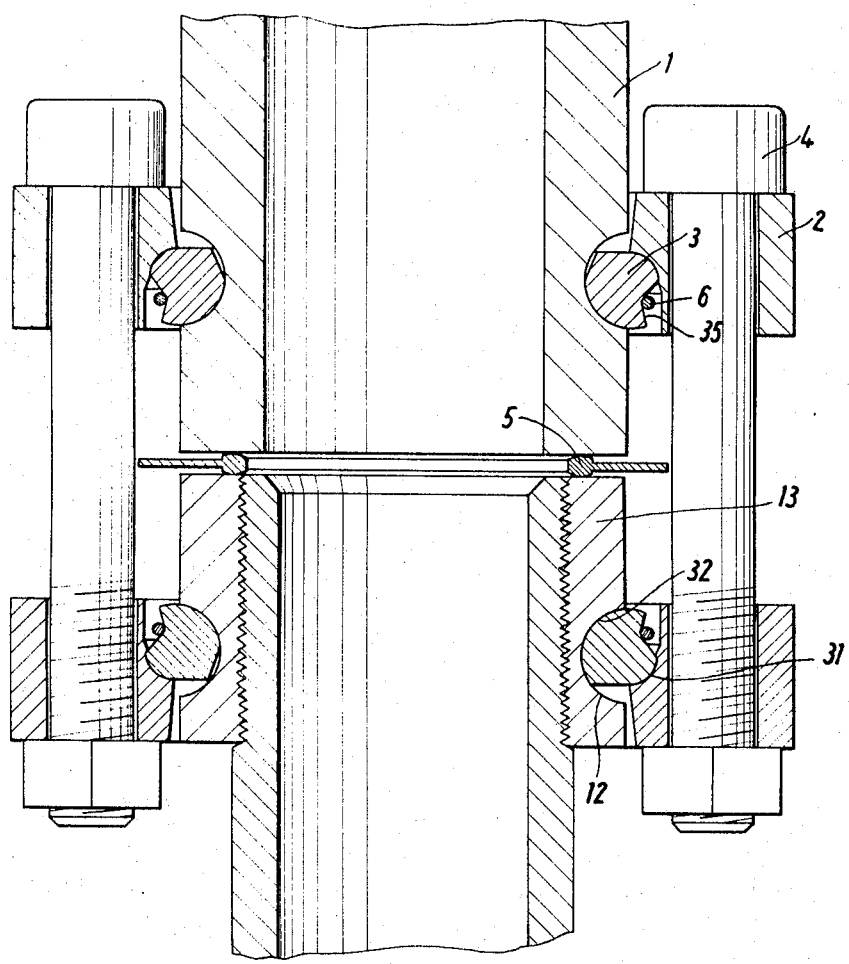
FIG. 2 is a view similar to that in FIG. 1, showing pipes of different diameter.

FIG. 2, generally similar to FIG. 1, illustrate joining of pipes having different diameter. The groove 12 therein is disposed in a collar 13, screwed onto pipe end 1, and a synclinal recess 35 is provided to accommodate an elastic element 6, e.g., a rubber band.

Figure 3:
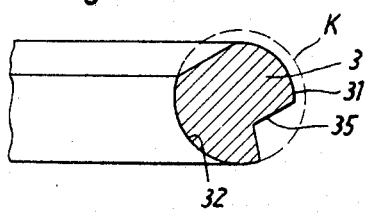
FIGS. 3–5 are sections of spacer rings of different cross sections.
Figure 4:
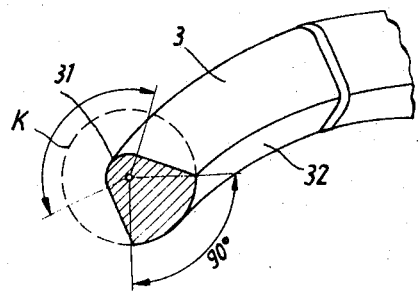

FIG. 3 shows a preferred form of a spacer ring 3 wherein, as previously explained, the outer surface 31 is annularly curved but has a smaller radius of curvature than the inner surface 32. K denotes the imaginery or assumed circle showing the concentricity, and 35 is a synclinal recess. FIG. 4 is another embodiment of a spacer ring 3. The inner ring surface 32 here is substantially a quadrant, whereas the outer surface 31 is a sector, slightly rounded on top, and the extremities of 31 and 32 contact each other.

Figure 5:

In FIG. 5, the embodiment is shown wherein the inner surface 32 also is approximately a quadrant, and the outer surface 31 is offset therefrom so that an edge 33 forms.

We claim as our invention:

1. A connection for pressure conduit pipes comprising an annular groove defined parallel and near the ends in the external surface of each pipe to be joined, a loose flange about each of said ends, means operable for connecting both said flanges to each other, and a spacer ring disposed in each of said grooves and having an inner and an outer ring surface, the inner ring surface being curved and engaging a surface portion of the respective groove, and the outer ring surface being curved and engaging a surface portion of the respective flange, the radius of curvature of said inner surface of the ring cross section being larger than the radius of curvature of said outer ring surface, the centers of said radii of curvature approximately coinciding.

2. The combination as defined in claim 1, wherein, in the cross section of siad spacer ring, the outer surface is a sector within an imaginary circle; and the inner surface is substantially a quadrant of said circle, the extremities of said sector and quadrant abutting on each other.

3. The connection as defined in claim 1, wherein, in the cross section of said spacer ring, the outer surface is circularly curved and has a smaller radius of curvature than the likewise circularly curved inner surface, both said surfaces having a common center of curvature.

4. The connection as defined in claim 3, wherein the ratio of the radius of curvature of the outer surface to that of the inner surface is 1:1.4 to 2.6.

5. The connetcion as defined in claim 4, wherein said ratio is 1:2.

6. The connection as defined in claim 1, wherein the inner surface of said spacer ring is substantially quadrant-shaped and is offset, at a point determining the inner diameter of the ring, shortly before the point nearest the ring axis about the center of curvature of an imaginary circle, thereby forming an edge.

7. The connection as defined in claim 1, wherein between said inner and outer surfaces, at the outer periphery of said spacer ring, an annular synclinical recess is provided.

8. The connection as defined in claim 7, wherein an elastic element is disposed in said recess.

9. The connection as defined in claim 1, wherein said pipes are of like diameter.

10. The connection as defined in claim 1, wherein the pipes are of different diameters.

11. The connection as defined in claim 1, wherein gasketing means are interposed between the pipe ends.

12. The connection as defined in claim 1, wherein said pipe ends to be joined abut one against the other in a straight line.

13. The connection as defined in claim 1, wherein said pipe ends abut against each other at an angle and are beveled in conformance with said angle.

References Cited

UNITED STATES PATENTS

| 1,295,263 | 2/1919 | Blom | 285—368 |
| 2,347,469 | 4/1944 | Dies | 285—415 |

EDWARD C. ALLEN, Primary Examiner.

WAYNE L. SHEDD, Assistant Examiner.

U.S. Cl. X.R.

285—414; 333—98